US 6,525,844 B1

(12) United States Patent
Lange et al.

(10) Patent No.: US 6,525,844 B1
(45) Date of Patent: Feb. 25, 2003

(54) SCANNER DEVICE

(75) Inventors: Helmut Lange, Schönkirchen (DE); Axel Gebhardt, Mönkeberg (DE); Axel Heuer, Fahren (DE)

(73) Assignee: Heidelberger Druckmaschinen Aktiengesellschaft, Heidelberg (DE)

( * ) Notice: Subject to any disclaimer, the term of this patent is extended or adjusted under 35 U.S.C. 154(b) by 0 days.

(21) Appl. No.: 09/406,003

(22) Filed: Sep. 24, 1999

(30) Foreign Application Priority Data

Sep. 30, 1998 (DE) .......................... 198 44 776
Aug. 4, 1999 (DE) .......................... 199 36 620

(51) Int. Cl.$^7$ ................................ H04N 1/04
(52) U.S. Cl. ................ 358/493; 358/484; 358/487
(58) Field of Search ................. 358/493, 487, 358/484

(56) References Cited

U.S. PATENT DOCUMENTS 4,568,984 A * 2/1986 Juergensen et al. ......... 358/293
4,897,737 A * 1/1990 Shalev ....................... 358/489
5,929,435 A * 7/1999 Han ........................... 250/234

FOREIGN PATENT DOCUMENTS

EP 0 270 011 6/1988

* cited by examiner

Primary Examiner—Edward Coles
Assistant Examiner—Houshang Safaipour
(74) Attorney, Agent, or Firm—Schiff Hardin & Waite

(57) ABSTRACT

In a device for point-by-point and line-by-line scanning of masters chucked on scanner drums having different diameters with an optoelectronic scanner element, which converts the scan light modulated with the content of the master and focused with the scanner objective into an image signal, a scanner element comprising a reflected light illumination is provided for generating an illumination spot on an opaque original. The scanner objective for correction of the focusing of the scan light onto the scanner element given employment of scanner drums having different diameters—is seated displaceable on the optical axis of the scanner element into radial working positions determined by the diameter of the respective scanner drums. The reflected light illumination can be displaced in the direction of the optical axis by the focal intercept change of the scanner objective for the purpose of optimizing the illumination spot given employment of scanner drums of different sizes.

17 Claims, 5 Drawing Sheets

SCANNER DEVICE

BACKGROUND OF THE INVENTION

The invention is in the field of electronic reproduction technology and is directed to a device for pixel-by-pixel and line-by-line, optoelectronic scanning of masters chucked on a scanner drum. Such a scanner drum device, referred to as a drum scanner below, can be designed for scanning black-and-white or chromatic masters in reflected light and/or transmitted light.

A drum scanner for scanning transparency masters is composed, for example, of a rotating, transparent scanner drum onto which a transparency master to be scanned is chucked, of a light source for pixel-by-pixel illumination of the transparency master and of a scanner element having a scanner objective, a scanner diaphragm and an optoelectronic transducer for converting the scan light the transparency master allows to pass into an image signal, which represents the luminance values of the scanned picture elements.

The light required for the pixel-by-pixel illumination of the transparency master is transported, for example, from a light source located outside the scanner drum through a light conductor into the hollow-cylindrical interior of the scanner drum and is imaged thereat onto the transparency master as an illumination spot with a matching objective and a deflection mirror. The scan light modulated with the image content of the transparency master proceeds through the scanner objective into the scanner element located outside the scanner drum and is converted thereat into an image signal by optoelectronic conversion.

The scanner element on the one hand and the optical elements on the other hand are respectively secured to an arm of a U-shaped feed support, whereby the arm carrying the optical elements projects into the scanner drum at the end face.

For planar scanning of the transparency master, the feed support moves in the axial direction of the rotating scanner drum.

In order to be able to scan masters having different formats, the standard scope of a drum scanner comprises scanner drums having different diameters that are chucked in the drum scanner dependent on the format of the master to be scanned. In this case, lens systems must be manually replaced at the feed support for optimum setting of the size of the illumination spot on the transparency master in order to compensate the different radial distances between the central arm of the feed support and the generated surface of the respective scanner drum. For optimum focusing of the luminance-modulated scan light coming from the transparency master onto the scanner diaphragm, the scanner element is equipped with interchangeable lenses that must be manually pivoted into the beam path dependent on the diameter of the scanner drum employed. The employment of such sets of lenses and interchangeable objectives is relatively complicated.

SUMMARY OF THE INVENTION

It is therefore an object of the invention to improve a device for pixel-by-pixel and line-by-line, optoelectronic scanning of transparency and opaque masters chucked on scanner drums such that optical adaptations, particularly given employment of scanner drums having different diameters, can be implemented in a simple way and automatically to the farthest-reaching extent.

According to the apparatus of the invention for point-by-point and line-by-line opto-electronic scanning of a master, a scanner drum is provided for chucking a master to be scanned. An illumination unit is provided for the master. A scanner objective is provided, and a scanner element converts the scan light modulated with the content of the master and then the scan light is focused with the scanner objective into an image signal. A feed support is provided in which the scanner objective in the scanner element are arranged, the feed support executing a feed motion in the direction of a rotational axis of the scanner drum for scanning of the master. The scanner comprises a reflected light illumination for generating an illumination spot on an opaque master. The scanner objective corrects focusing of the scan light onto the scan element given employment of scanner drums having different diameters and is seated displaceable into a radial working position on an optical axis of the scanner element determined by a diameter of the respective scanner drum. Reflective light illumination is displaceably arranged for optimizing the illumination spot given employment of scanner drums having different diameters.

The invention is explained in greater detail below with reference to FIGS. 1 through 5.

DESCRIPTION OF THE PREFERRED EMBODIMENTS

Figure 1:
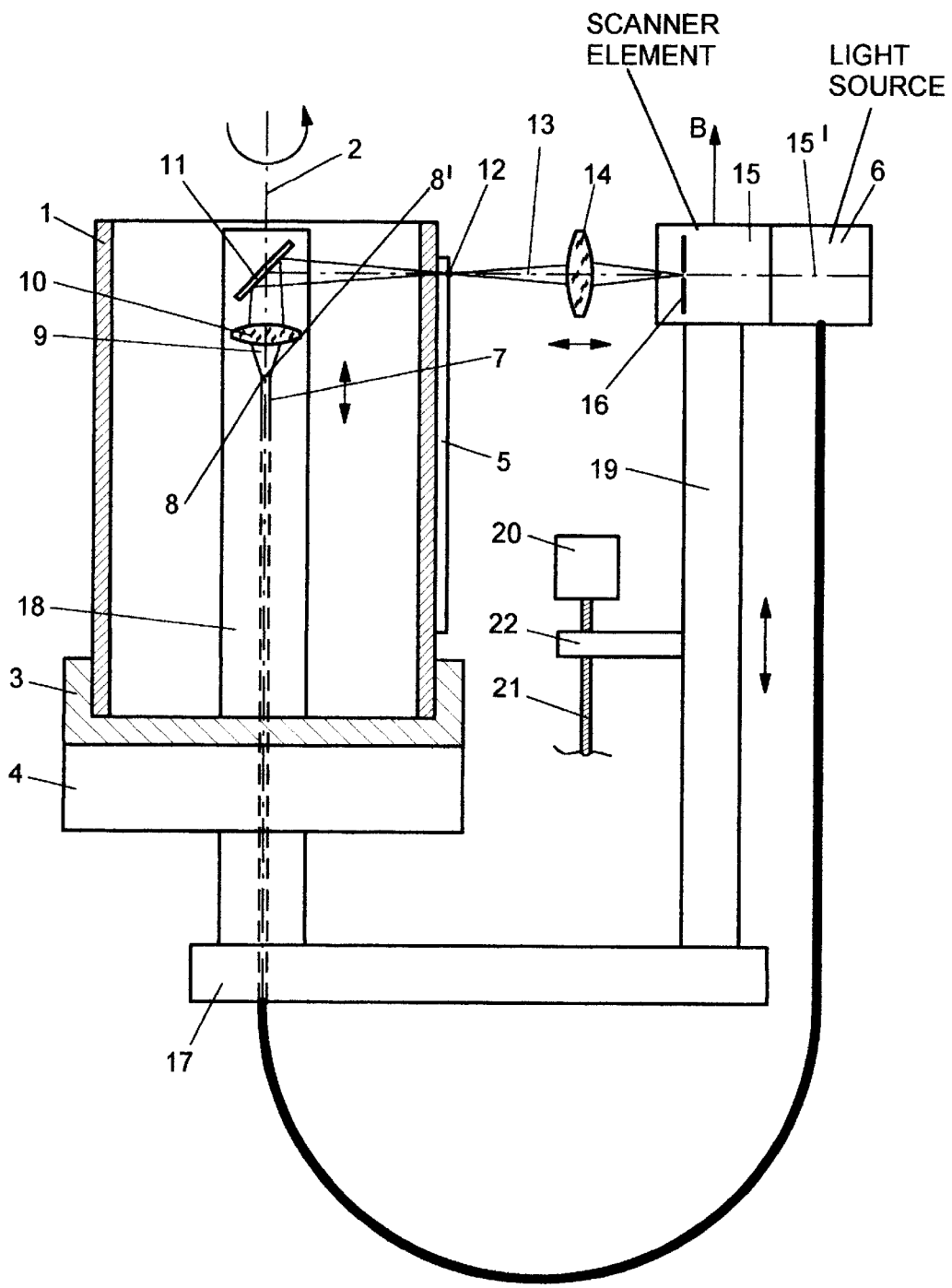
FIG. 1 shows the fundamental structure of a drum scanner.

FIG. 1 shows the fundamental structure of a drum scanner. A transparent scanner drum 1 having, for example, a vertical rotational axis 2 is coupled to a rotational drive 4 with a clamp mechanism 3. The rotational axis 2 of the scanner drum 1 can also be arranged horizontally or at an arbitrary angle relative to the floor space of the drum scanner.

A transparency master 5 is mounted on the scanner drum 1. For scanning transparency masters 5 having different formats, scanner drums 1 having different diameters are chucked in the drum scanner with the assistance of the clamp mechanism 3. The clamp mechanism 3 is constructed, for example, according to German Utility Model 296 23 523, and the rotational drive is constructed according to German Published Application 196 01 524.

For pixel-by-pixel illumination of the transparency master 5, an illumination unit 7, 8, 10, 11 is provided in the hollow-cylindrical interior of the scanner drum 1, this illumination unit being supplied from a light source 6 located outside the scanner drum 1. A light beam generated by the light source 6 is transported by a light conductor 7 into the illumination unit and emerges through a light exit face 8 of the light conductor 7 in radial direction of the rotational axis 2. The light beam 9 that has emerged is deflected in the radial direction onto the transparency master 5 with a matching objective 10 in the rotational axis 2 and deflection mirror 11 arranged at 45° relative to the rotational axis 2, as a result whereof a light spot 8' in the light exit face 8 of the light conductor 7 is imaged onto the transparency master 5 as an illumination spot 12.

The scan light 13 that is allowed to pass by the transparency master 5 and modulated with the luminance values of the scanned picture elements proceeds through a scanner objective 14 into a scanner element 15 located outside the scanner drum 1 and having a scanner diaphragm 16 and an optoelectronic transducer not shown, whereby illumination spot 12 and scanner objective 14 lie on the optical axis 15' of the scanner element 15 proceeding radially relative to the scanner drum 1.

In the scanner element 15, the scanned light 13 is converted with the optoelectronic transducer into an image signal B for further-processing. Scanner element 15 and light source 6 are structurally united in the illustrated exemplary embodiment. Scanner objective 14, scanner element 15 and light source 6 move axially along the rotating scanner drum 1 for planar scanning of the master.

So that the illumination spot 12 in the planar master scanning always lies in the optical axis 15' of the scanner element 15, at least the deflection mirror 11—the illumination unit with light conductor 7, matching objective 10 and deflection mirror 11 in the exemplary embodiment—must be entrained synchronously with the scanner objective 14 and the scanner element 15 in the axial direction. For that purpose, a U-shaped feed support 17 having an inner arm 18 and an outer arm 19 is present, this being moved in the axial direction of the scanner drum 1 during the scanning of the master by a feed drive 20 with the assistance of a spindle 21 and a nut segment 22 located at the feed support 17. The inner arm 18 of the feed support 17 is guided by the rotational drive 4, projects into the scanner drum 1 at the end face, and extends along the rotational axis 2. The inner arm 18 carries the illumination unit 7, 8, 10, 11. The outer arm 19 of the feed support 17 proceeding parallel to the inner arm carries the scanner objective 14, the scanner element 15 and the light source 6.

For scanning opaque masters, a reflected light illumination not shown in FIG. 1 is present that generates a corresponding illumination spot 12 on the opaque master 5'. In this case, the modulated scan light 13 reflected from the opaque master to be scanned is converted in the scanner element 15 into an image signal B.

When scanner drums 1, 1' having different diameters are chucked in the drum scanner, the distance between the deflection mirror 11 and the transparency master 5 mounted on the scanner drum 1 as well as the distance between the transparency master 5 and the scanner diaphragm 16 in the scanner element 15 change. In this case, the size of the illumination spot 12 on the transparency master 5 and the focusing of the scan light 13 coming from the transparency master 5 onto the scanner diaphragm 16 must be corrected.

The size correction of the illumination spot 12 on the transparency master 5 advantageously occurs with an automatic change of the imaging scale with which the light spot 8' of the light exit face 8 of the light conductor 7 is imaged on the transparency master 5 as an illumination spot 12. The modification of the imaging scale is preferably achieved by modifying the distance between the light exit face 8 of the light conductor 7 and the matching objective 10 secured stationarily to the inner arm 18, preferably by displacing the light conductor 7 on the inner arm 18 in the direction of the rotational axis 2 of the scanner drum 1 into axial working positions $A_k$ and $A_g$, which are predetermined by the diameter of the scanner drums 1, 1' respectively employed, as a result whereof an optimum illumination of the transparency master 5 is achieved given employment of scanner drums 1, 1' having different diameters.

The recorrection of the focusing of the scanned light 13 onto the scanner diaphragm 16 in the scanner element 15 occurs by modifying the radial distance between the generated surface of the respective scanner drum 1, 1' and the scanner objective 14 by displacing the scanner objective 14 into radial working positions $B_k$ and $B_g$, that are predetermined by the diameter of the scanner drums 1, 1' respectively employed.

Figure 2:
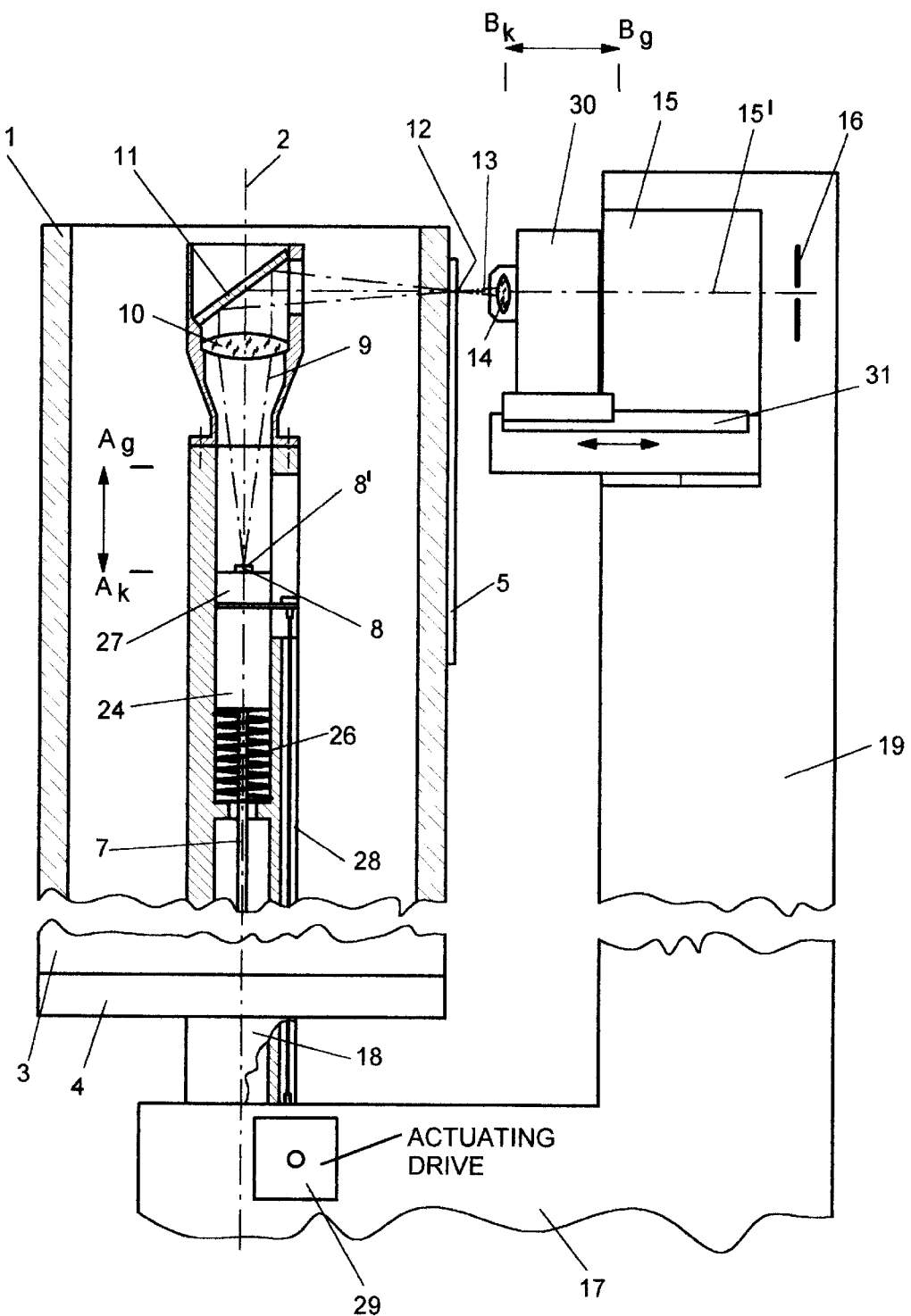
FIG. 2 is an exemplary embodiment of the devices for axial displacement of a light conductor and for radial displacement of a scanner objective, as well as the positioning of the light conductor and of the scanner objective given employment of a scanner drum having a small diameter.

FIG. 2 shows an exemplary embodiment of the devices for axial displacement of the light conductor 7 at the inner arm 18 and for radial displacement of the scanner objective 14 at the outer arm 19 of the feed support 17, as well as the positioning of the light conductor and of the scanner objective given employment of a scanner drum 1 having a smaller diameter.

The end region of the light conductor 7 with the light exit face 8 is enveloped by a cylindrical light conductor mount 24 that is seated in sliding fashion in the hollow-cylindrical inner arm 18 of the feed support 17. A compression spring 26 is arranged between a recess 25 at the inside wall of the inner arm 18 and the light conductor mount 24. A radial finger 27 is attached to the light conductor mount 24, the radial finger being connected to a controllable actuating drive 29 via a tension cable 28 proceeding in the direction of the inner arm 18. The actuating drive 29 is, for example, a stepping motor that drives a cable drum. The actuating drive 29 is preferably attached to the feed support 17. The light conductor mount 24 and, thus, the light exit face 8 of the light conductor 7 is automatically displaced opposite the force of the compression spring 26 into one of the two axial working positions $A_k$ and $A_g$ corresponding to the diameter of the scanner drum 1, 1' used at the moment—into the axial working position $A_k$ for the scanner drum 1 having a small diameter in the illustrated example—and is fixed thereat.

The scanner object 14 is mounted on an objective holder 30 that is displaced with an actuating drive not shown with guides 31 onto one of the two radial working positions $B_k$ or $B_g$, corresponding to the diameter of the scanner drum 1, 1' employed at the moment—into the radial working position $A_k$ for the scanner drum 1 having a small diameter in the illustrated example—and is fixed thereat.

Figure 3:
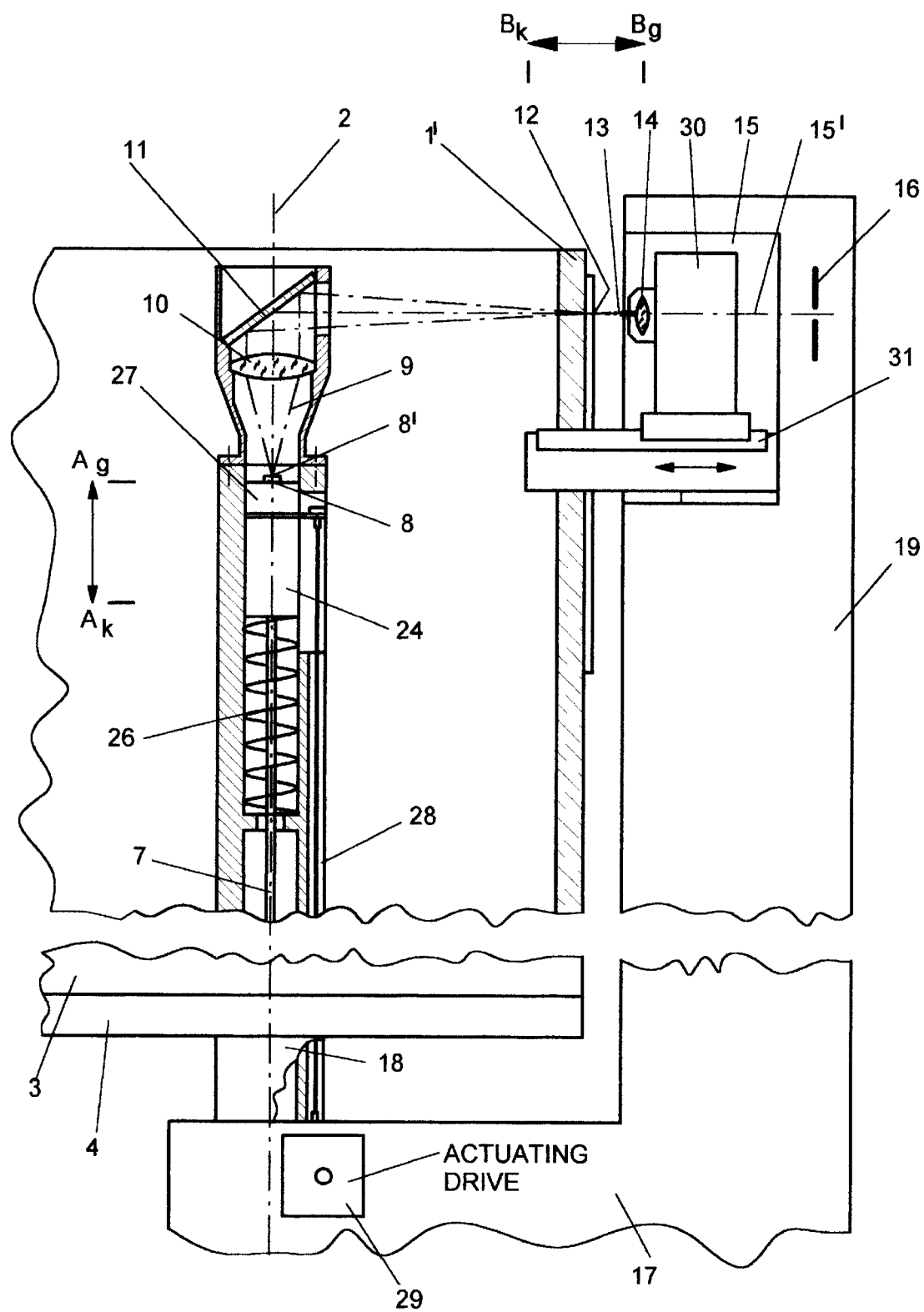
FIG. 3 illustrates the positioning of the light conductor and of the scanner objective given employment of a scanner drum having a large diameter.

FIG. 3 shows the positioning of the light conductor 7 and of the scanner objective 14 given employment of a scanner drum 1' having a large diameter. In this case, the exit face 8 of the light conductor 7 is displaced into the axial working position $A_g$, and the objective holder 30 with the scanner objective 14 is displaced into the radial working position $B_g$.

It can be seen from FIGS. 2 and 3 that an optimum size of the illumination spot 12 and an optimum focusing of the scan light 13 onto the scanner element 15 are respectively achieved in an advantageous way given different diameters of the scanner drums 1, 1'.

Figure 4:
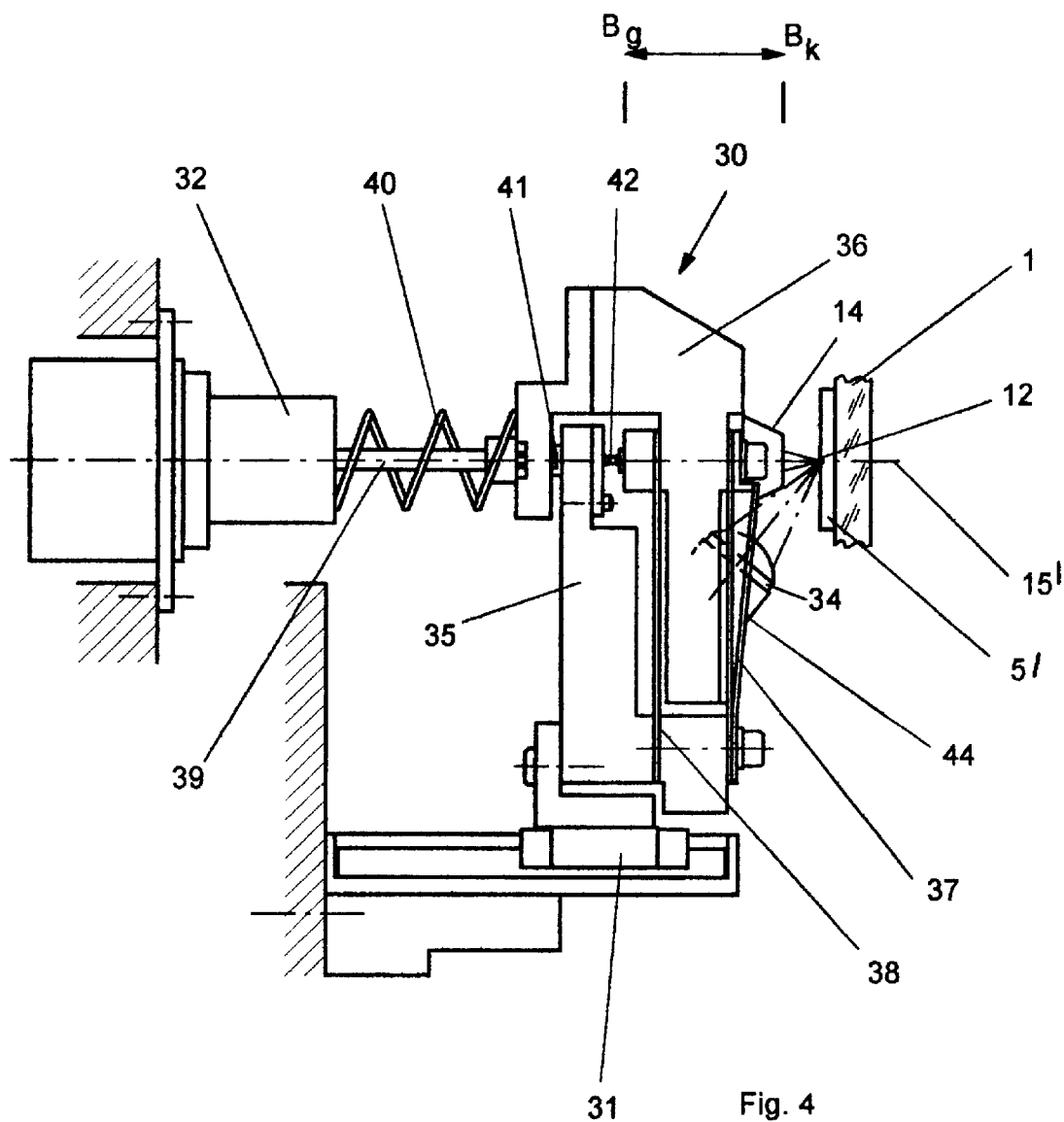
FIG. 4 is an exemplary embodiment of a scanner element having a reflected illumination for scanning opaque masters as well as the positioning of the scanner element given employment of a scanner drum having a small diameter.
Figure 5:
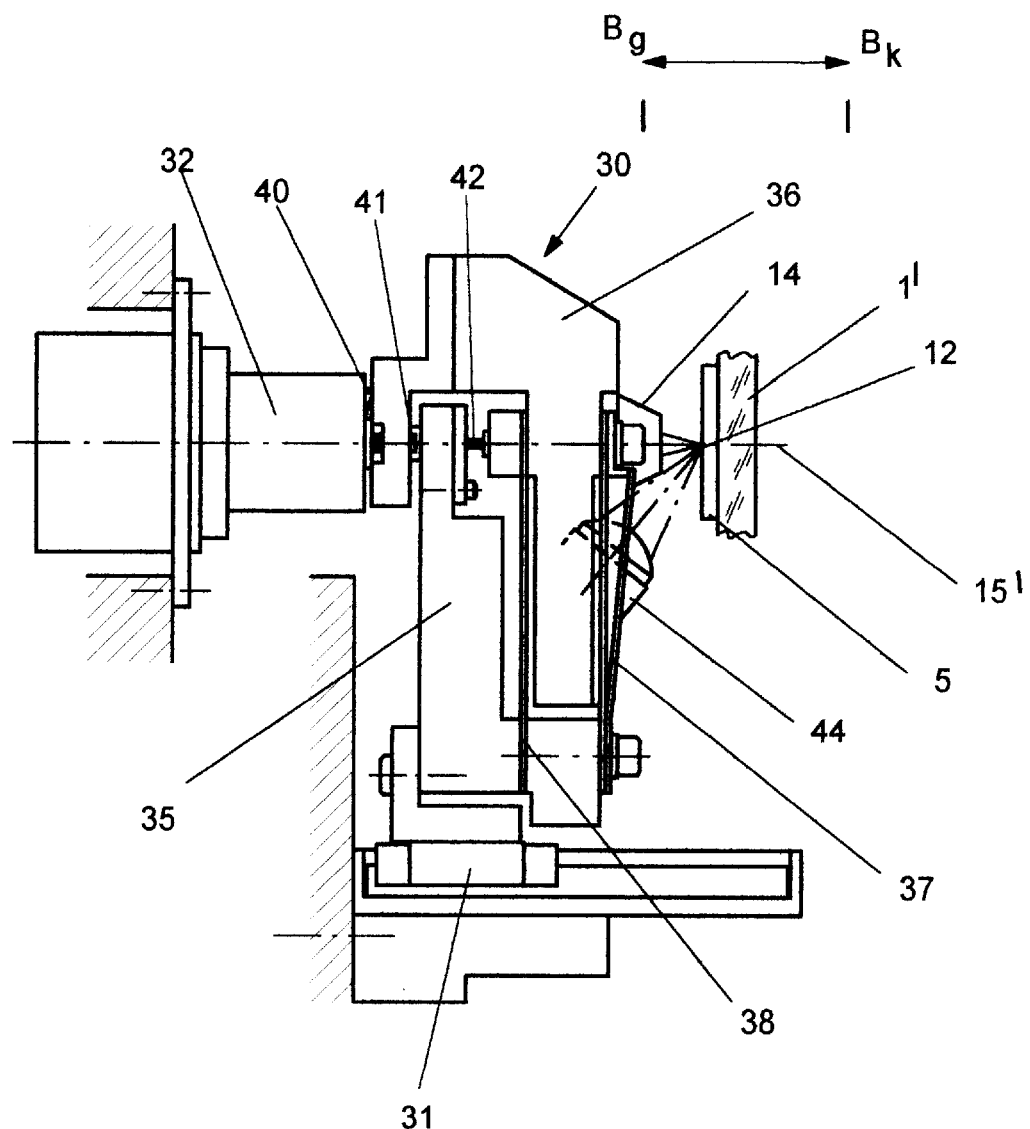
FIG. 5 shows the positioning of the scanner element given employment of a scanner drum having a large diameter.

FIG. 4 shows an exemplary embodiment of the scanner element 15 with a reflected light illumination 34 for scanning opaque masters 5', as well as the positioning of the reflected light illumination 34 given employment of a scanner drum 1 having a small diameter, whereas the positioning given employment of a scanner drum 1' with a large diameter is shown in FIG. 5.

By displacing the scanner objective 14 for the purpose of adaptation to scanner drums 1, 1' having different diameters according to FIGS. 2 and 3, the focal intercept of the scanner objective 14 changes because the scanner diaphragm 16 is stationary in the scanner element 15. For this reason, the reflected light illumination 34 when scanning opaque masters 5' must be readjusted in adaptation to different diameters of the scanner drums 1, 1' such that the reflected light illumination is also optimum given an optimum sharpness setting of the scanner objective 14.

The objective holder 30 is essentially composed of an objective carrier 35 carrying the scanner objective 14 that slides on the guides 31, and of an illumination carrier 36 carrying the reflected light illumination 34. The illumination carrier 36 is connected to the objective carrier 35 via resilient parallel guides 37, 38. Objective carrier 35 and illumination carrier 36 are displaceable in common with the guides 31 in radial direction relative to the respective scanner drum 1, 1' onto the predetermined, radial working positions $B_k$ and $B_g$. The common displacement of the objective carrier 35 and illumination carrier 36 occurs with a traction spindle 39 attaching at the objective carrier 35 that is driven by the actuating drive 32. The traction spindle 39 is surrounded by a coil spring 40 whose ends are supported at the objective carrier 35 and at the actuating drive 32.

With the parallel guides 37, 38, the illumination carrier 36 can implement a parallel motion with reference to the objective carrier 35 into two stable limit positions. The parallel motion is limited by two adjustable detents 41, 42 at the objective carrier 35 in the region of the optical axis 15' of the scanner objective 14, whereby the spacing of the detents 41, 42 on the optical axis 15' corresponds to the deriving change in focal intercept of the scanner objective 14 given employment of a scanner drum 1 having a small diameter FIG. 4 and a scanner drum 1' having a large diameter FIG. 5.

The play of forces between the coil spring 40 and a leaf spring 44, which is secured to the objective carrier 35 and presses against the illumination carrier 36 in the direction of the coil spring 40, defines—dependent on the respectively assumed, radial working position $B_k$ and $B_g$—which of the limit positions defined by the detents 41, 42 the illumination carrier 36 assumes given its parallel motion.

In the radial working position $B_k$ shown in FIG. 4 that the scanner objective 14 assumes given a scanner drum 1 having a small diameter, the coil spring 40 is relaxed and the force of the leaf spring 44 is greater than the force of the coil spring 40. In this case, the illumination carrier 36 is pressed with the differential force into the limit position defined by the detent 42.

The scanner objective 14 and the reflected light illumination 34 are adjusted relative to one another such that, in the limit position of the illumination carrier 36 defined by the detent 42, the optical axis 15' of the scanner objective 14 and the optical axis 45 of the reflected light illumination 34 intersect on the master 5 to be scanned in the focal intercept distance of the scanner objective 14, as a result whereof the sharpness and illumination optimum is achieved in the intersection of the optical axes 15', 45 given a scanner drum 1 having a small diameter.

In the radial working position $B_g$ shown in FIG. 5 that the scanner objective 14 assumes given a scanner drum 1' with a large diameter, the coil spring 40 is tensed and the force of the leaf spring 44 is lower than the force of the coil spring 40. In this case, the illumination carrier 36 is pressed with the differential force into the limit position defined by the detent 41.

In the limit position defined by the detent 41, the intersection of the optical axis 45 of the reflected light illumination 34 with the optical axis 15' of the scanner objective 14 is automatically shifted by the focal intercept change of the scanner objective 14 deriving given sharp focus onto the scanner drum 1' having a large diameter, so that the sharpness and illumination optimum is also advantageously automatically achieved given employment of a scanner drum 1' with a large diameter.

Although various minor modifications might be suggested by those skilled in the art, it should be understood that our wish to embody within the scope of the patent warranted hereon all such modifications as reasonably and properly come with the scope of our contribution to the art.

We claim as our invention:

1. An apparatus for point-by-point and line-by-line, opto-electronic scanning of an opaque master, comprising:
    a scanner drum for chucking a master to be scanned;
    an illumination unit for the master;
    a scanner objective;
    a scanner element for converting scan light modulated with a content of the master and focused with the scanner objective into an image signal;
    a feed support at which the scanner objective and the scanner element are arranged, the feed support executing a feed motion in the direction of a rotational axis of the scanner drum for scanning of the master;
    the scanner comprising a reflected light illumination for generating an illumination spot on the opaque master;
    said scanner objective correcting focusing of the scan light onto the scanner element given employment of scanner drums having different diameters and being seated displaceable into a radial working position on an optical axis of the scanner element determined by a diameter of the respective scanner drum; and
    the reflected light illumination being displaceably arranged for optimizing the illumination spot given employment of scanner drums having different diameters.

2. The apparatus according to claim 1 wherein the reflected light illumination is displaceable substantially in a direction of the optical axis of the scanner element by a focal intercept change of the scanner objective caused by displacement of the scanner objective onto the radial working positions.

3. The apparatus according to claim 1 wherein:
    the scanner objective is arranged on an objective carrier, and the reflected light illumination is arranged on an illumination carrier;
    the objective carrier and illumination carrier are connected to one another with a parallel guide;
    the illumination carrier is displaceable into two limit positions substantially parallel to the optical axis in a region of the optical axis relative to the object carrier; and
    the objective carrier and the illumination carrier are displaceable onto the radial working positions in common with guides.

4. The apparatus according to claim 3 wherein the two limit positions of the illumination carrier are defined by detents in the region of the optical axis.

5. The apparatus according to claim 4 wherein the movement of the illumination carrier limited by the detents is selected equal to a focal intercept change of the scanner objective given displacement onto the radial working positions.

6. The apparatus according to claim 3 wherein a common displacement of the objective carrier and illumination carrier into the radial working positions occurs with an actuating drive.

7. The apparatus according to claim 6 wherein the objective carrier and the illumination carrier are connected to the actuating drive via a spindle.

8. The apparatus according to claim 3 wherein:
   a spring supported at the actuating drive and the objective carrier is provided;
   a leaf spring secured to the objective carrier is provided which presses against the illumination carrier in the direction of the spring;
   each limit position of the illumination carrier has a radial working position allocated to it; and
   forces of the springs are matched to one another such that the illumination carrier is respectively pressed into the limit position allocated to the momentary radial working position.

9. The apparatus according to claim 1 wherein:
   the scanner drums are designed transparent for scanning transparency masters;
   the feed support displaceable in the direction of the rotational axis of the respective scanner drum comprises first and second arms proceeding parallel to the rotational axis, whereof the first arm projects centrally into the respective scanner drum from the end face;
   the second arm carries the scanner objective and the scanner element and the first arm carries an illumination unit for generating the illumination spot on the transparency master;
   the illumination unit is formed of a matching objective lying on the rotational axis, a deflection mirror oriented transversely relative to the rotational axis, and of a light conductor having a light exit face;
   at least a sub-section of the light conductor in a region of the light exit face is seated displaceable at the first arm carrying the illumination unit in the direction of the rotational axis relative to the matching objective; and
   a device is provided that displaces the light conductor onto axial working positions prescribed by the diameter of the respective scanner drums for the purpose of modifying the imaging scale of the illumination spot.

10. The apparatus according to claim 9 wherein the device for displacing the light conductor is actuated by an actuating drive.

11. The apparatus according to claim 10 wherein the actuating drive is attached to the feed support.

12. The apparatus according to claim 9 wherein:
   an end region of the light conductor at the light exit face is enveloped by a cylindrical light conductor mount;
   at least the first arm of the feed support carrying the light conductor is designed hollow-cylindrically in regions;
   the light conductor mount is seated in sliding fashion in the hollow-cylindrical interior of the first arm;
   the light conductor mount is supported by a compression spring that is located in the interior of the first arm and envelopes the light conductor; and
   the light conductor mount is connected via connecting elements to the actuating drive, as a result whereof the light conductor mount and the light conductor are displaceable into the axial working positions against the force of the compression spring.

13. The apparatus according to claim 9 wherein the first arm of the feed support carrying the illumination unit projects as inner arm into the respective scanner drum at the end face.

14. The apparatus according to claims 9 wherein:
   the respective scanner drum is chucked into the apparatus with a clamp mechanism;
   the clamp mechanism is rotatorily driven by a rotational drive; and
   the inner first arm of the feed support is guided into the scanner drum by the rotational drive and the clamp mechanism.

15. The apparatus according to claim 9 wherein the illumination unit is supplied via a light conductor from a light source located at the feed support.

16. The apparatus according to claim 1 wherein the rotational axis of the respective scanner drum is aligned perpendicular to a floor space of the scanning apparatus.

17. A method for scanning a master, comprising the steps of:
   mounting an opaque master to be scanned on a scanner drum;
   providing an illumination unit for the master;
   providing a scanner objective;
   converting with the scanner element scan light modulated with a content of the master and focused with the scanner objective into an image signal;
   providing a feed support at which the scanner objective and the scanner element are arranged, and executing a feed motion in a direction of a rotational axis of the scanner drum for scanning of the master;
   providing a reflected light illumination for generating an illumination spot on the opaque master;
   with said scanner objective, correcting focusing of the scan light onto the scanner element given employment of scanner drums having different diameters and being seated displaceable into a radial working position on an optical axis of the scanner element determined by a diameter of the respective scanner drum; and
   displaceably arranging the reflected light illumination for optimizing the illumination spot given employment of scanner drums having different diameters.

* * * * *